Nov. 15, 1960 C. E. HENSON 2,960,172
DEPTH CONTROL FOR MOUNTED PLOW
Filed Nov. 30, 1955 2 Sheets-Sheet 1
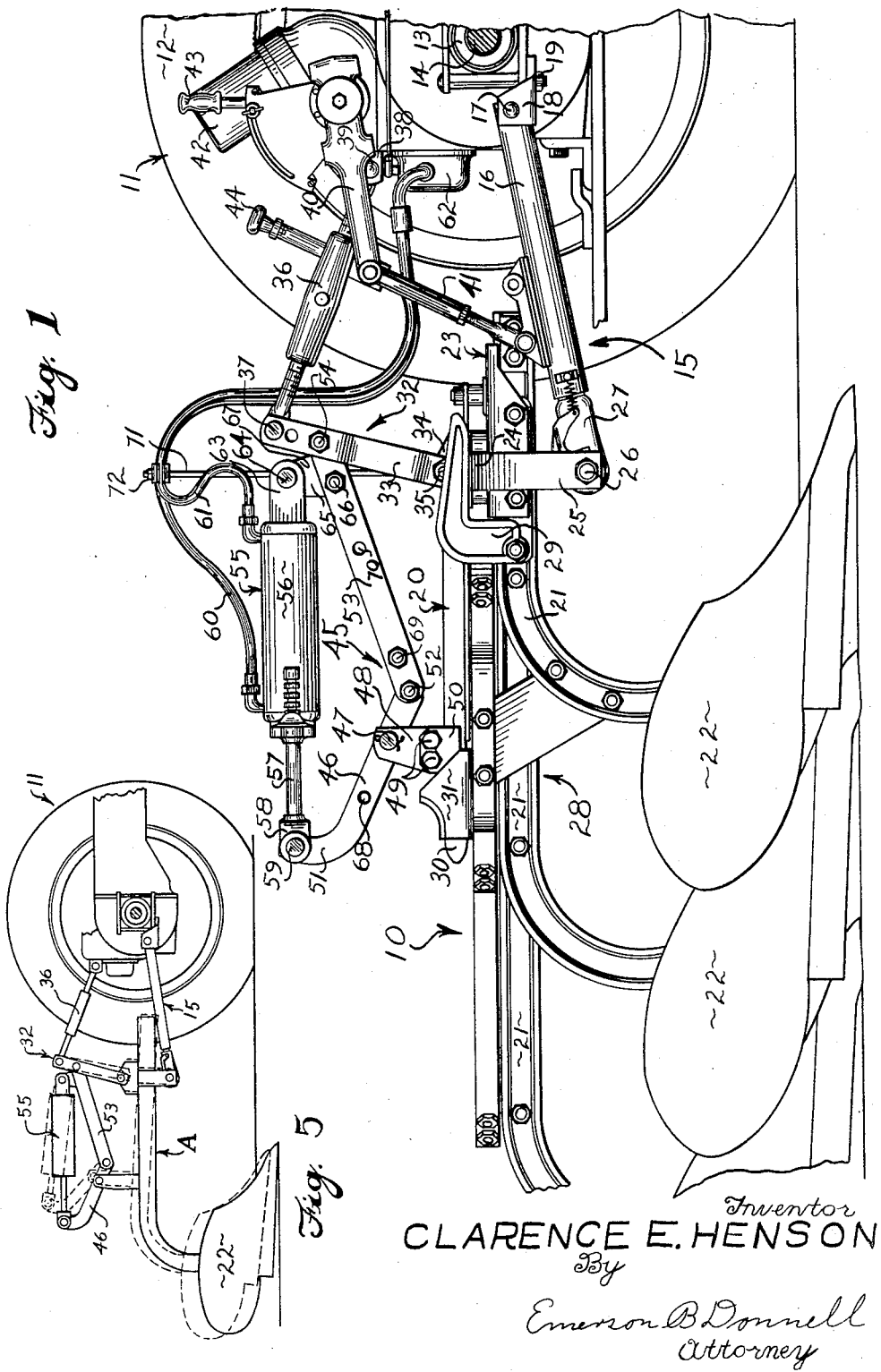
CLARENCE E. HENSON *Inventor*
By
Emerson B Donnell
*Attorney*

Nov. 15, 1960 C. E. HENSON 2,960,172
DEPTH CONTROL FOR MOUNTED PLOW
Filed Nov. 30, 1955 2 Sheets-Sheet 2
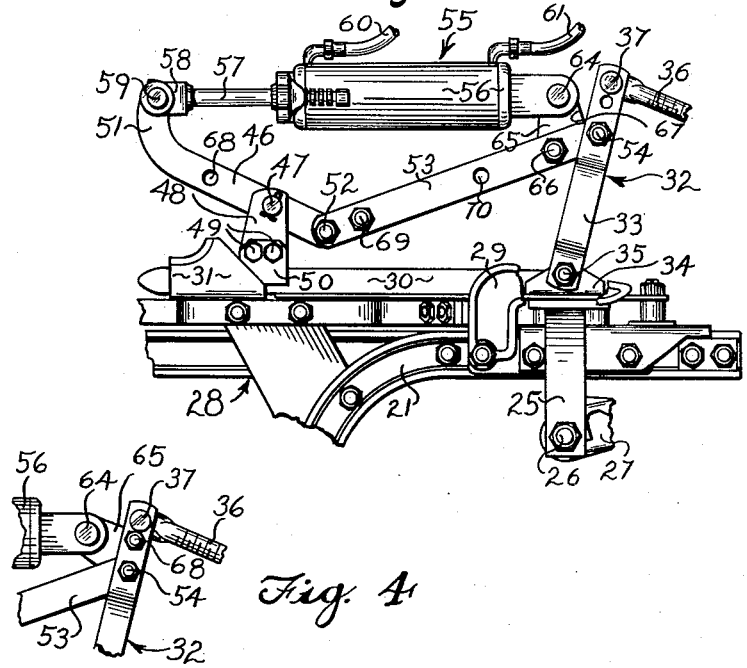
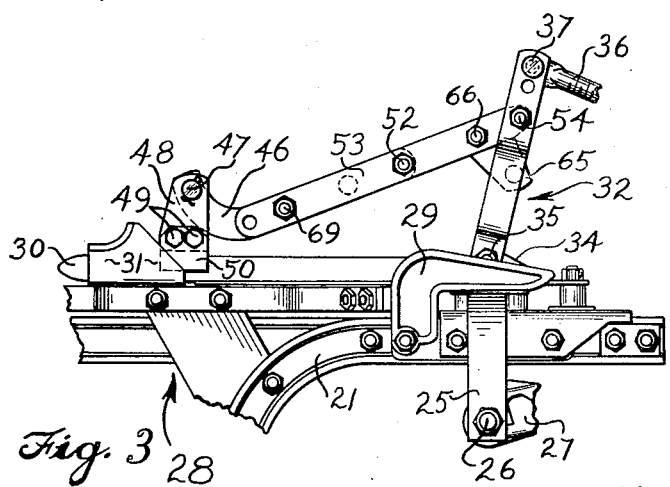
Inventor
CLARENCE E. HENSON
By
Emerson B Donnell
Attorney

United States Patent Office 2,960,172
Patented Nov. 15, 1960

2,960,172

DEPTH CONTROL FOR MOUNTED PLOW

Clarence E. Henson, Rockford, Ill., assignor to J. I. Case Company, Racine, Wis., a corporation of Wisconsin Filed Nov. 30, 1955, Ser. No. 550,240

2 Claims. (Cl. 172—448)

The present invention relates to agricultural implements and more particularly to a rear-attached tractor-mounted plow including a strut arrangement which can be utilized either as a power operated depth control unit or as a rigid mast brace.

In the mounting of a rear-attached plow, it is desirable that provisions be made whereby the angle or tilt of the plowshare relative to the ground can be altered to control the depth of the plowing operation. For instance, if the angle or tilt of the plowshare relative to the ground is increased with respect to a given plowshare position, the plowshare will run deeper into the ground and consequently cut a deeper furrow. If the plowshare is shifted so that its angle or tilt relative to the ground is less, the plowshare will run more shallow in the ground and consequently cut a more shallow furrow. The present invention contemplates a strut arrangement between the mast member and the implement which can be power operated so as to control its effective length and consequently the angle or tilt of the implement relative to the draft element. The invention further contemplates that the effective lengh of this strut arrangement can be changed by the operator from his position on the tractor through the utilization of convenient controls so that the tilt of the plowshare, either before it enters the ground or while in operation, is under his complete control.

On the present rear-attached plows in use, mechanically adjustable struts, a screw arrangement for instance, have been employed; however, arrangements of this type are extremely difficult to adjust while the plow is in operation and exposes the operator to inherent dangers, inasmuch as he must turn in his seat and reach down sufficiently to operate the turning handle. When the operator is manipulating the turning handle, he obviously cannot have full control of the tractor.

In certain plowing operations, the power-operated strut arrangement is not essential for effecting a uniform depth of plowing. It is contemplated, therefore, that the power means can be removed from the strut and the strut utilized as a rigid mast brace.

Accordingly, it is a primary object of the present invention to generally improve the operation and construction of agricultural implements of this type.

A further object of the present invention is to provide a power-operated strut between the mast member and the implement member of a tractor mounted rear-attached agricultural implement for adjusting the tilt of the implement relative to the ground.

A still further object of the present invention is to provide a strut which can be utilized either as a power operated depth control unit or as a rigid brace member of fixed length.

The construction and operation of the apparatus involved will become more readily apparent as the disclosure progresses and particularly points out the various features of this invention. Accordingly, the present invention may be considered as comprising the various constructions, combinations, and/or sub-combinations of parts as is hereinafter fully set forth in the detailed description and appended claims, reference being had to the accompanying drawings in which:

Fig. 1 is a side view of a tractor implement combination embodying the subject invention, with one of the rear tractor wheels removed to more clearly show details of construction, and with parts broken away.

Fig. 2 is a side view of certain structure shown in Fig. 1, with parts broken away to show details of construction.

Fig. 3 is a view similar to Fig. 2 showing the strut utilized as a rigid brace member.

Fig. 4 is a side view of a modification of certain structure shown in Fig. 2.

Fig. 5 is a side view of a tractor implement combination shown diagrammatically, and illustrating the operation of the strut when utilized as a depth control mechanism.

Referring particularly to Fig. 1 of the drawings, apparatus embodying the principles of the present invention comprises generally a plow implement, designated generally by the number 10, in tractor-mounted relationship with respect to a tractor 11.

The tractor 11 can be of any suitable or conventional construction and comprises in the present instance rear traction wheels 12, only one of which is shown, and a rear axle housing 13 which encloses a rear axle 14.

The implement 10 is draft connected with the tractor by a drawbar element 15 which includes in the present instance a pair of rearwardly extending horizontally spaced drawbars 16, only one being visible, each of which is pivotally connected for up and down swinging movement by a suitable bolt 17 to a mounting bracket 18 rigidly fixed by a bolt 19 with the rear axle housing 13 of the tractor.

The plow implement 10 in the present instance comprises a beam frame member 20 which is pivotally connected to the rearward ends of each of the drawbars 16 for up and down swinging movement relative thereto. More specifically, the beam frame member consists of a plurality of laterally spaced and rigidly interconnected plow beams 21, each of which is bent downwardly at its rearward end so as to carry a suitable plowshare 22 in earth-engaging relationship.

The beam frame member specifically disclosed in Fig. 1 is of two-piece construction, which construction permits lateral swinging movement of the plow beams relative to the tractor to a predetermined extent while at the same time permitting the plow beams to become disassociated or disconnected from that portion of the beam frame member carried by the drawbars when the plow shares 22 become lodged in an immovable body or strike a heavy object such as a large stone. An appreciation of the specific details of a plow of this type has no importance and affords no material aid in fully appreciating the principles of the present invention and it is, therefore, believed that a detailed description thereof is unnecessary. It will be noted, however, that the specific details of this plow are disclosed and described in the application entitled Draft-Propelled Implement, in the name of Richard W. Bushmeyer, Serial No. 330,828, now Patent No. 2,897,903. For the present disclosure, it is deemed sufficient to state merely that the beam frame member 20 includes a draft portion 23 which has a suitable transverse rigid drawbar element 24 with downwardly depending arms 25, only one of said arms being visible. Each of these arms 25 has a draft pin 26 fixed thereto, the draft pins being so spaced as to be received respectively in a gripping claw 27 fixed to the rearward end of each of the drawbars 16. The plow beams 21, which constitute the plow portion 28 of this two-piece beam frame member 20 is interconnected with the draft portion 23 so that the same is swingable about a substantially vertical axis and these two portions are intimately held in proper association with respect to one another by suitable forwardly open finger-brackets 29 which receive the transverse rigid bar 24 on opposite sides of the axis of swinging movement of plow portion 28.

As previously suggested, suitable latch means are provided for releasing the plow portion from the draft portion when resistance to movement of the plowshares 22 through the ground exceeds a predetermined figure. The draft portion also includes a rearwardly extending stinger 30 which is received in a transverse slotted bracket 31 carried by one of the plow beams which defines the degree of side to side movement of the plow portion relative to the draft portion as well as supports the plow portion relative to the draft portion when the plow implement is moved into transport position relative to the ground.

An upstanding mast member 32, which is preferably fabricated from a pair of rigid bars 33 and is substantially Y-shaped, is secured in inverted fashion so that each of its legs is swingably secured to a mounting bracket 34 extending upwardly from the draft portion by a suitable transverse bolt 35. The mast is held substantially rigid with the drawbar element by means of a middle link 36, preferably in the form of a turnbuckle, which is anchored between the top end of the mast by a pin 37 and a mounting ear 38 of the rear axle housing 13 of the tractor by a pin 39. The drawbar element 15, or more specifically each of the drawbars 16 are each connected to an associated crank or lift arm 40 by means of a suitable lift link 41 in a manner well known in the art, the crank arms being rockable in a lifting direction by a hydraulic motor or cylinder 42, which is operable upon actuation of a suitable control handle 43. In this connection, it will be appreciated that the left-hand lift link includes a turnbuckle arrangement 44 which affords vertical movement of the associated end of the rigid transverse bar 24 to thereby adjust for lateral tilt of the plow. The drawbars, the lift links and the crank arms as well as the middle link constitute a three-point linkage system and since the details of this linkage system affords no material part of the present invention, it is believed that a further description thereof is unnecessary.

In combination with the beam frame member, the draft element and the master member, and interconnected between the beam frame member and the mast member is a strut broadly designated by the number 45 which, as will be more fully appreciated hereinafter, is effective for adjusting the angle of the beam frame member relative to the draft element so as to control the effective depth of operation of the plowshares and which can be utilized so as to constitute a rigid connection of a fixed length between the beam frame member and the mast member. More specifically, this strut includes a lever 46 fulcrumed in one position about a transverse pin 47 carried by a mounting standard 48. The mounting standard 48 is secured by a pair of bolts 49 to a supporting bracket 50 which in turn is suitably fixed, preferably by welding, to the stinger 30 adjacent the rearward end thereof. It will be appreciated, therefore, that the lever 46 is rockable up and down about the axis of pin 47, and that the rearward end of the lever is provided with an upwardly curved anchor portion 51. The other end of the lever 46 is pivotally connected by a suitable bolt 52 to one end of a rigid link 53 and the other end of this rigid link is pivotally connected to the mast 32 by a suitable bolt 54 adjacent the upper end thereof.

The angle of the beam frame member 28 relative to the draft element 15 can be changed by altering the effective length of the strut 45 or in other words the distance between the axis of pin 47 and bolt 54. This is effected by positioning a suitable motor means 55, preferably a hydraulic cylinder of any suitable or well known construction, between the forward end of the link and the anchor portion of the lever. The hydraulic cylinder consists of a suitable cylindrical body portion 56 and a piston rod 57 which has fixed to its one end a suitable clevis 58. The clevis is pivotally secured to the anchor portion 51 of the lever 46 by a pin 59. The other end of the rod 57 carries a piston head which is slidable in the cylindrical body portion 56 in response to fluid pressure directed by way of conduits 60 and 61 into the opposite ends of the body portion. The conduits in turn are connected with a suitable hydraulic pump which is enclosed in a housing 62 and the effective length of the hydraulic cylinder 55 can be altered by the operator by means of a suitable control positioned within easy reach from his seat on the tractor. The other end of the body portion 56 is provided with a suitable mounting head 63 which is pivotally secured by a pin 64 to a mounting plate 65. This mounting plate is pivotally secured by a bolt 66 to the link 53 adjacent the mast member 32 and is so shaped that its leading edge 67 is moved into abutting relationship with one bar 33 of the mast 32 when the hydraulic cylinder is placed into position between lever 46 and link 53 and firmly anchors one end of the hydraulic cylinder.

While the mounting plate 65 is preferably connected to the link 53 in the manner described, it will be appreciated that this mounting plate can be rigidly connected directly to the mast member. This arrangement is shown in Fig. 4 wherein the mounting plate 65 is fixed to the mast member by the bolt 54 and a bolt 68.

In operation it will be appreciated that the effective length of the strut can be altered so as to alter the angle of the beam frame member relative to the draft element which in turn effects the angle at which the plowshares will enter the soil and the relative depth of the plowing operation. It will be appreciated that this is an extremely desirable feature under varying soil conditions and that an operator, once he becomes familiar with the operation of this adjustable strut, can plow his fields irrespective of varying soil conditions at a constantly uniform depth. The principles of operation are most clearly illustrated in Fig. 5 wherein the beam frame member is disclosed diagrammatically and designated as A. It will be noted that when the effective length of the cylinder is shortened from its solid line position to its dotted line position that the lever 46 is caused to swing about the axis of pin 47 from its solid line position to its dotted line position so that the effective length of the strut is also shortened. The beam frame element is consequently angled upwardly from its solid line position to its dotted line position and the plowshares 22 are carried at a sharper angle relative to the ground. When the effective length of the cylinder, for instance from its dotted line position to its full line position, is lengthened, the lever is swung into its solid line position and the beam frame member is likewise moved into its solid line position, once again altering the relative angle of the beam frame member with the drawbar element and reducing the angle of the plowshares relative to the ground. It will be appreciated that these adjustments can be easily made by the operator from his position on the tractor and that they can be made swiftly and accurately.

As previously explained, the strut 45 can be utilized with a hydraulic cylinder as a hydraulic depth control unit or as a rigid brace member which forms a connection of fixed length between the beam member and the mast member. It will be appreciated, of course, that when the strut is utilized as a rigid brace member that it does not function as a depth control unit.

When utilizing the strut as a rigid brace member, see Fig. 3, the hydraulic cylinder is first disconnected from lever 46 and link 53 and removed. The lever 46 is then removed from the standard 48 by removing the pin 47 and is disconnected from the rearward end of the link 53 by removing the bolt 52. The anchor portion 51 of the lever 46 is then swingably connected to the standard 48 by the pin 47 and an opening 68 formed in the lever 46 is moved into alignment with a bolt 69 carried by the link 53 so as to receive and be secured by the same. The opening formed in the forward end of the lever which received bolt 52 is moved into alignment with an opening 70 formed in the link and the bolt 52 is received in these aligned openings so as to, in cooperation with bolt 69, hold the lever and link in rigid side to side relationship, see Fig. 3. It will be noted that the mounting plate 65 swings downwardly between the legs and the mast member 32 when the hydraulic cylinder is removed.

Referring once again to Fig. 1, it will be noted that a suitable conduit holder 71 is provided which has clamps 72 for holding the conduits in an out-of-the-way position.

While a single embodiment of the invention has been described in detail therein, it will be obvious to those skilled in the art that many changes and substitutions or equivalents might be made. For example, the plow may be of a one piece construction that is connected to the drawbar 16 in the same manner as the two-piece breakaway plow disclosed in the drawing. In this arrangement, the mounting standard 48 would be rigidly secured to the plow beams 21. It is obvious that the claimed invention is not limited to use with either of the aforementioned plows but that it will perform its intended functions if employed with plows similar in design to those referred to.

It is, of course, desired to cover by the appended claims all such modifications as fall within the true spirit and scope of the invention.

What is claimed is:

1. In a tractor mounted implement of the type including a drawbar element pivoted to the tractor, a beam frame member pivoted to said drawbar element and an upstanding mast member pivoted to said beam frame member and braced with said tractor, the combination of a strut connecting said beam frame member and said mast member comprising a lever fulcrumed on one of said members, a link pivoted to said lever and to the other member, and removable motor means connected between said link and said lever for swinging said lever for altering the effective length of said strut for adjusting the angle of said plow, and means to rigidly secure said link and lever together to form a connection of fixed length between said frame member and said mast member when said motor means is removed.

2. In a tractor mounted plow of the type including a drawbar element pivoted to the tractor, a beam frame member pivoted to said drawbar element and an upstanding mast member substantially rigid with the drawbar element, the combination of a strut connecting said beam frame member and said mast member comprising a lever fulcrumed on said beam frame member, a link pivoted to said lever and to said mast member, and removable motor means connected with the free end of said lever and with said mast for swinging said lever for altering the effective length of said strut for adjusting the angle of said plow, and means to rigidly secure said link and lever together to form a connection of fixed length between said frame member and said mast member when said motor means is removed.

References Cited in the file of this patent

UNITED STATES PATENTS

| | | |
|---|---|---|
| 2,609,649 | Watson | Sept. 9, 1952 |
| 2,670,672 | Markel | Mar. 2, 1954 |
| 2,755,721 | Rusconi | July 24, 1956 |
| 2,852,994 | Mighell | Sept. 23, 1958 |

FOREIGN PATENTS

| | | |
|---|---|---|
| 665,140 | Great Britain | Jan. 16, 1952 |